United States Patent
King

(10) Patent No.: US 11,235,916 B2
(45) Date of Patent: Feb. 1, 2022

(54) SELF-LOCKING TIE WITH ELASTOMERIC FEATURES AND METHODS FOR MANUFACTURING THE SAME

(71) Applicant: Lock Right, LLC, West Valley City, UT (US)

(72) Inventor: Creighton King, West Valley City, UT (US)

(73) Assignee: Lock Right, LLC, West Valley City, UT (US)

( * ) Notice: Subject to any disclaimer, the term of this patent is extended or adjusted under 35 U.S.C. 154(b) by 0 days.

(21) Appl. No.: 16/863,601

(22) Filed: Apr. 30, 2020

(65) Prior Publication Data

US 2020/0324951 A1      Oct. 15, 2020

Related U.S. Application Data

(63) Continuation of application No. PCT/US2018/058308, filed on Oct. 30, 2018.

(60) Provisional application No. 62/579,029, filed on Oct. 30, 2017.

(51) Int. Cl.
| | |
|---|---|
| *B65D 63/10* | (2006.01) |
| *B29C 45/16* | (2006.01) |
| *B29C 45/26* | (2006.01) |
| *F16L 3/233* | (2006.01) |
| *F16L 3/23* | (2006.01) |
| *B29L 31/00* | (2006.01) |

(52) U.S. Cl.
CPC ...... *B65D 63/1072* (2013.01); *B29C 45/1676* (2013.01); *B29C 45/26* (2013.01); *F16L 3/2334* (2013.01); *F16L 3/2336* (2013.01); *B29L 2031/727* (2013.01)

(58) Field of Classification Search
CPC ... B29C 33/405; B29C 45/1676; B29C 45/26; B29L 2031/727; B65D 63/1072; F16L 3/2334; F16L 3/2336
See application file for complete search history.

(56) References Cited

U.S. PATENT DOCUMENTS

| | | | |
|---|---|---|---|
| 3,518,727 A * | 7/1970 | Eberle | F16L 3/233 24/16 PB |
| 6,044,524 A | 4/2000 | Sorensen et al. | |
| 8,479,361 B2 | 7/2013 | Every | |
| 2006/0162130 A1 | 7/2006 | Cook | |

(Continued)

OTHER PUBLICATIONS

USPTO as International Searching Authority, "International Search Report and Written Opinion," International Application No. PCT/US2018/58308, dated Jan. 22, 2019.

*Primary Examiner* — David M Upchurch
(74) *Attorney, Agent, or Firm* — Dentons Durham Jones Pinegar

(57) ABSTRACT

An apparatus, system, and method that relate to a self-locking tie with one or more elastomeric features are disclosed. A strap of the self-locking tie includes one or more features that physically anchor the strap to a base of a mold during a multi-stage molding process. These features may include one or more recesses. Side walls of the one or more recesses may be sloped, as defined by anchors with undercut regions that physically engage material of the strap to prevent movement of the strap within a mold cavity of the base as the strap cools and as the strap is exposed between its formation and formation of one or more elastomeric features thereon.

10 Claims, 9 Drawing Sheets

(56) References Cited

U.S. PATENT DOCUMENTS

| | | |
|---|---|---|
| 2010/0236030 A1 | 9/2010 | Dyer |
| 2013/0067695 A1 | 3/2013 | Giotto et al. |
| 2014/0082923 A1* | 3/2014 | Owen ................ B65D 63/1027 |
| | | 29/525.03 |
| 2016/0214776 A1 | 7/2016 | King |
| 2017/0057715 A1* | 3/2017 | Kato .................. B60R 16/0215 |

* cited by examiner

SELF-LOCKING TIE WITH ELASTOMERIC FEATURES AND METHODS FOR MANUFACTURING THE SAME

CROSS-REFERENCE TO RELATED APPLICATION

This application is a continuation of PCT Application No. PCT/US2018/058308, filed on Oct. 30, 2018 and titled APPARATUS, SYSTEM, AND METHOD FOR FORMING AN ELASTOMER LINED SELF LOCKING TIE ("the '308 Application") which claims the benefit of priority to the Oct. 30, 2017 filing date of U.S. Provisional Patent Application No. 62/579,029, titled APPARATUS, SYSTEM, AND METHOD FOR FORMING AN ELASTOMER LINED SELF-LOCKING TIE ("the '029 Provisional Application) is hereby made. The entire disclosures of the '308 Application and the '029 Provisional Application are hereby incorporated herein.

TECHNICAL FIELD

This disclosure relates generally to self-locking ties and more particularly to self-locking ties with elastomeric features. More specifically, this disclosure relates to methods for manufacturing self-locking ties with elastomeric features, and the features of such self-locking ties that facilitate multi-stage molding processes.

RELATED ART

Self-locking ties have conventionally been referred to as cable ties, tie-wraps, hose ties, and zip ties. A self-locking tie is a type of fastener for holding items together. A common use for self-locking ties is to hold electrical cables, electrical wires, or hoses together. The use of self-locking ties is not limited to electrical cables, electrical wires, and hoses, however. Conventional self-locking ties are typically constructed with smooth sides and relatively sharp corners.

The sharp corners of a conventional self-locking tie may cut into, scratch, or otherwise damage the objects it secures together. For example, the relatively sharp corners of a conventional self-locking tie may damage the electrical insulators on electrical cables and wires, and damage the walls of hoses, which may not only damage the electrical cables, electrical wires, and hoses, but may also result in serious incidental damage.

Self-locking ties have also been used as a temporary physical restraint for individuals. More specifically, a self-locking tie may be used to hold an individual's wrists and hands together, similar to the way in which handcuffs are used. When conventional self-locking ties are used to temporarily restrain an individual's hands, the relatively sharp edges of such self-locking ties may injure the restrained individual; for example, by cutting the individual, bruising the individual, or cutting off circulation to the individual's hands. Injuries resulting from the use of conventional self-locking ties by law enforcement agencies as temporary physical restraints may create liability problems for the law enforcement agencies.

Furthermore, the hard and inflexible nature of conventional self-locking ties offers little or no friction between the self-locking ties and the objects they encompass. In other words, conventional self-locking ties merely encompass objects as opposed to securely gripping them and holding them in place. This lack of friction between the self-locking tie and the encompassed objects often results in an incomplete cinch around the encompassed objects. The self-locking tie can therefore wiggle, slide, or otherwise move around the objects it is intended to securely hold in place. Movement in the self-locking tie may create stresses that may cause the self-locking tie to break or otherwise fail.

SUMMARY

A self-locking tie according to this disclosure is capable of securely encompassing objects while minimizing damage to the objects it collects and binds together. The disclosed self-locking tie has been developed in response to the present state of the art, and in particular, in response to the problems and needs in the art that have not yet been fully solved by previously available self-locking ties.

The self-locking tie may include a strap, a locking head and one end of the strap, at least one cavity in the strap, and one or more elastomeric features. The strap may include a head end and an opposite, tapered end. The strap also includes a first surface, or front side, and an opposite, second surface, or back side. The at least one cavity may be located in one or both of the first surface and the second surface. Each elastomeric feature may be at least partially positioned within a cavity and at least partially protrude beyond the first surface or the second surface of the strap. The locking head is located at the head end of the strap and includes an orifice capable of receiving the tapered end of the strap and the one or more elastomeric features protruding beyond the first surface and/or the second surface of the strap.

The strap may include a series of ridges. Each ridge of the series may extend across at least a portion of a width of the first surface of the strap. The series of ridges may extend along at least a portion of the length of the strap.

The at least one cavity may be located within the first surface of the strap, laterally adjacent to the series of ridges. In some embodiments, one or more cavities may be located on opposite sides of the series of ridges. The cavities may even surround the series of ridges. In other embodiments, one or more cavities may be located along a longitudinal center of the series of ridges. One or more cavities may additionally or alternatively open to a second surface of the strap. An elongated channel that extends along at least a portion of a length of the strap may define one or more cavities and/or one or more cavities may be defined by a series of voids.

Each elastomeric feature may include a cavity engaging portion and a protruding portion. The cavity engaging portion may substantially fill a cavity in the strap. The protruding portion may protrude beyond a surface of the strap to which the cavity opens. In a specific embodiment, the protruding portion of one or more elastomeric features may protrude beyond the first surface of the strap and beyond the ridges on the first surface.

A self-locking tie according to this disclosure may be manufactured in a multi-stage process. In one stage of the process, the strap may be molded. In another stage of the process, the elastomeric features may be formed. When molding processes are used to form the elastomeric features, the strap may remain at least partially within a cavity defined by a base of a mold. As the material that forms the strap cools, the strap may shrink. Accordingly, a cavity in the base of the mold may include one or more features that secure anchor the strap within the base of the mold as a first mold top, which was used to form a first surface of the strap, is removed and a second mold top, which will be used to form one or more elastomeric features on the first surface of the strap, is assembled with the base. These features are referred to as anchors. Each anchor may have a shape (e.g., a side wall oriented at an angle that defines a lip, or an overhang, etc.) that traps a portion of the material of the strap as the strap is molded and, thus, that holds a corresponding portion of the strap in place within the portion of the mold cavity defined by the base. As material is introduced into the portion of the mold cavity defined by the base, each anchor may define a recess in a second surface of the strap. Thus, the shape of each recess may correspond to the shape of the anchor by which it was defined. In embodiments where the anchor includes one or more side walls oriented at an angle, the side walls defining the outer periphery of the recess may be oriented at corresponding angles.

In addition to including one or more anchors, the base of the mold may also include one or more ejectors capable of forcing a corresponding portion of the strap from the portion of the mold cavity defined by the base of the mold. In some embodiments, each ejector may comprise a pin positioned to impact a portion of the strap that is secured to an anchor. As an example, an ejector may travel through a pathway that extends though the height of each anchor (e.g., at its center, etc.). That pathway may be referred to as a cylinder. The force with which each ejector impacts the strap may be sufficient to cause the strap to stretch enough to release the strap from a corresponding anchor.

In some embodiments, configurations of the cylinder through each anchor in the portion of the mold cavity in the base of the mold and the ejector that corresponds to that cylinder may enable the cylinder to receive material while the strap is formed. The material received by the cylinder may form a core that protrudes from a center of the recess defined in the second surface of the strap by an anchor; thus, a thickness of the strap at the location of each core is greater than a thickness of the strap at the locations of the recess that surrounds the core. Each core may have a thickness that enables it to absorb impact of the ejector without damaging the strap, as might otherwise happen if the ejector were to impact a recess in the second surface of the strap. In some embodiments, each core may have sidewalls that are oriented perpendicular to a base of the recess. In other embodiments, each core may be slanted relative to a base of the recess.

Other aspects of the disclosed subject matter, as well as features and advantages of the disclosed subject matter, will become apparent to those of ordinary skill in the art through consideration of the ensuing description, the accompanying drawings, and the appended claims.

BRIEF DESCRIPTION OF THE DRAWINGS

In order that the advantages of the invention will be readily understood, a description of the subject matter will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the accompanying drawings, in which.

DETAILED DESCRIPTION

Figure 1:
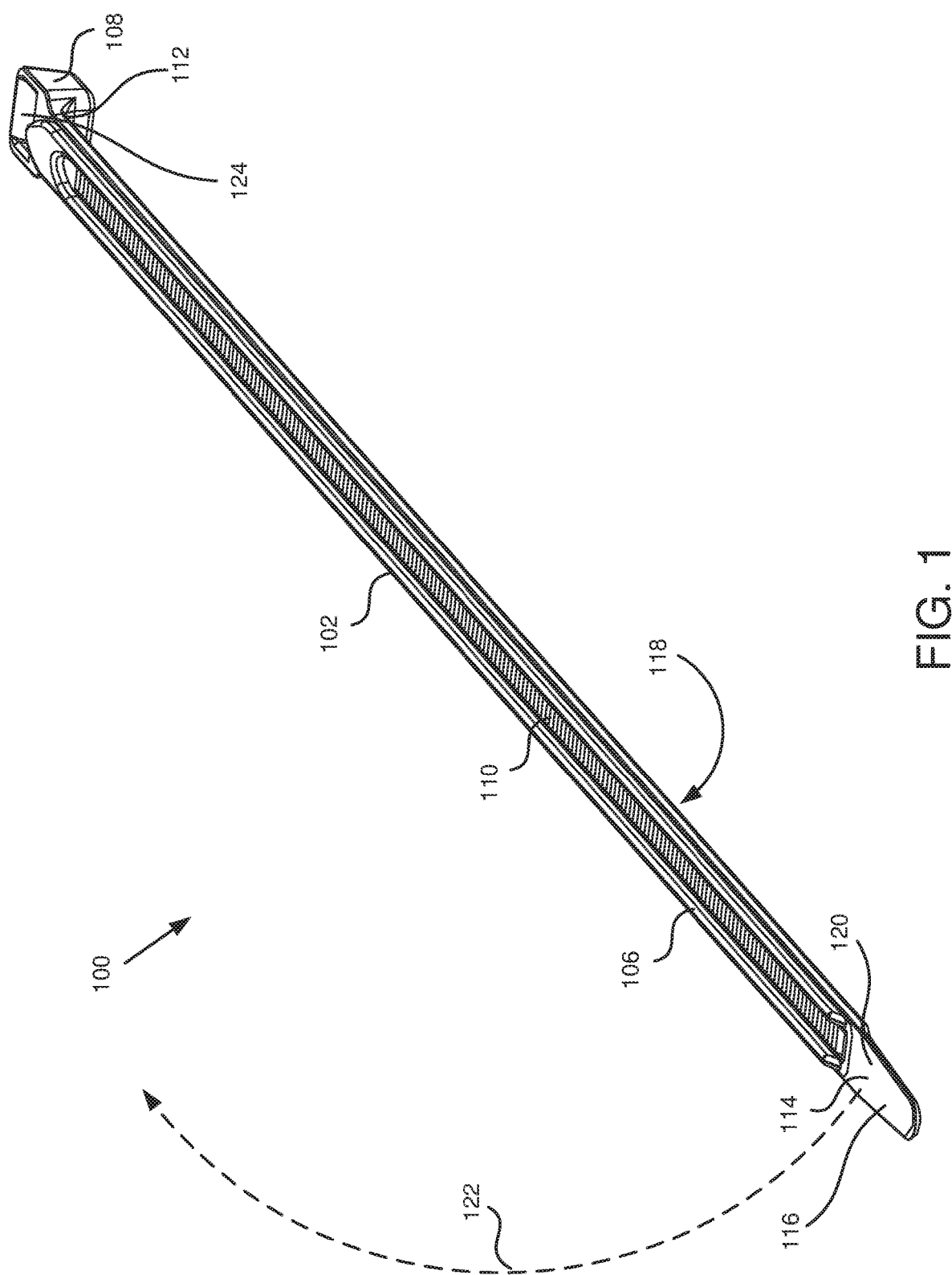
FIG. 1 is a perspective view illustrating one embodiment of a self-locking tie in accordance with the present subject matter.

FIG. 1 is a perspective view illustrating an embodiment of a self-locking tie 100 according to this disclosure. The self-locking tie 100 includes a strap 102, at least one cavity 104 (see FIG. 2), an elastomer segment 106, and a locking head 108. In certain embodiments, the self-locking tie 100 also includes a series of ridges 110 that extend across at least a portion of at least one surface of the strap 102.

The strap 102, in certain embodiments, is composed of pliable material such as nylon, plastic, etc. Thus, the strap 102 is bendable, allowing it to encompass one or more objects of various dimensions. The strap 102 includes a head end 112 opposite from a tapered end 114. The locking head 108 is positioned on, coupled to, or integrally formed on the head end 112 of the strap 102.

In certain embodiments, the tapered end 114 of the strap 102 comprises a substantially planar, pliable strap, extended in a lengthwise direction. In one embodiment, the tapered end 114 of the strap 102 can be considered the portion of the strap 102 extending from a position wherein the locking head 108 is positioned on, coupled to, or otherwise integrally formed on the head end 112 of the strap 102.

The tapered end 114 of the strap 102 includes a first surface 116 opposite from a second surface 118. In the embodiment illustrated in FIG. 1, the series of ridges 110 are depicted as extending across the first surface 116 of the tapered end 114 of the strap 102. In other embodiments, the series of ridges 110 extend across the second surface 118 of the strap 102. As depicted, the series of ridges 110 are formed across most of the length of the tapered end 114 of the strap 102. In other embodiments, the series of ridges 110 may be formed across a portion of the length of the tapered end 114 of the strap 102 that is less than the entire length of the tapered end 114 of the strap 102.

A tapered grasping tab 120 extends from the tapered end 114 of the strap 102. In use, a user moves the tapered grasping tab 120 in the direction indicated by arrow 122 and into an orifice 124 in the locking head 108 on the head end 112 of the strap 102 to form a loop with the strap 102. The tapered nature of the tapered grasping tab 120 facilitates insertion of the tapered grasping tab 120 into the orifice 124 in the locking head 108 on the head end 112 of the strap 102. The orifice 124 in the locking head 108 is sized and shaped to receive the tapered end 114 of the strap 102 and to receive the elastomer segment 106 which extends beyond the first surface 116 of the tapered end 114 of the strap 102.

Figure 2:
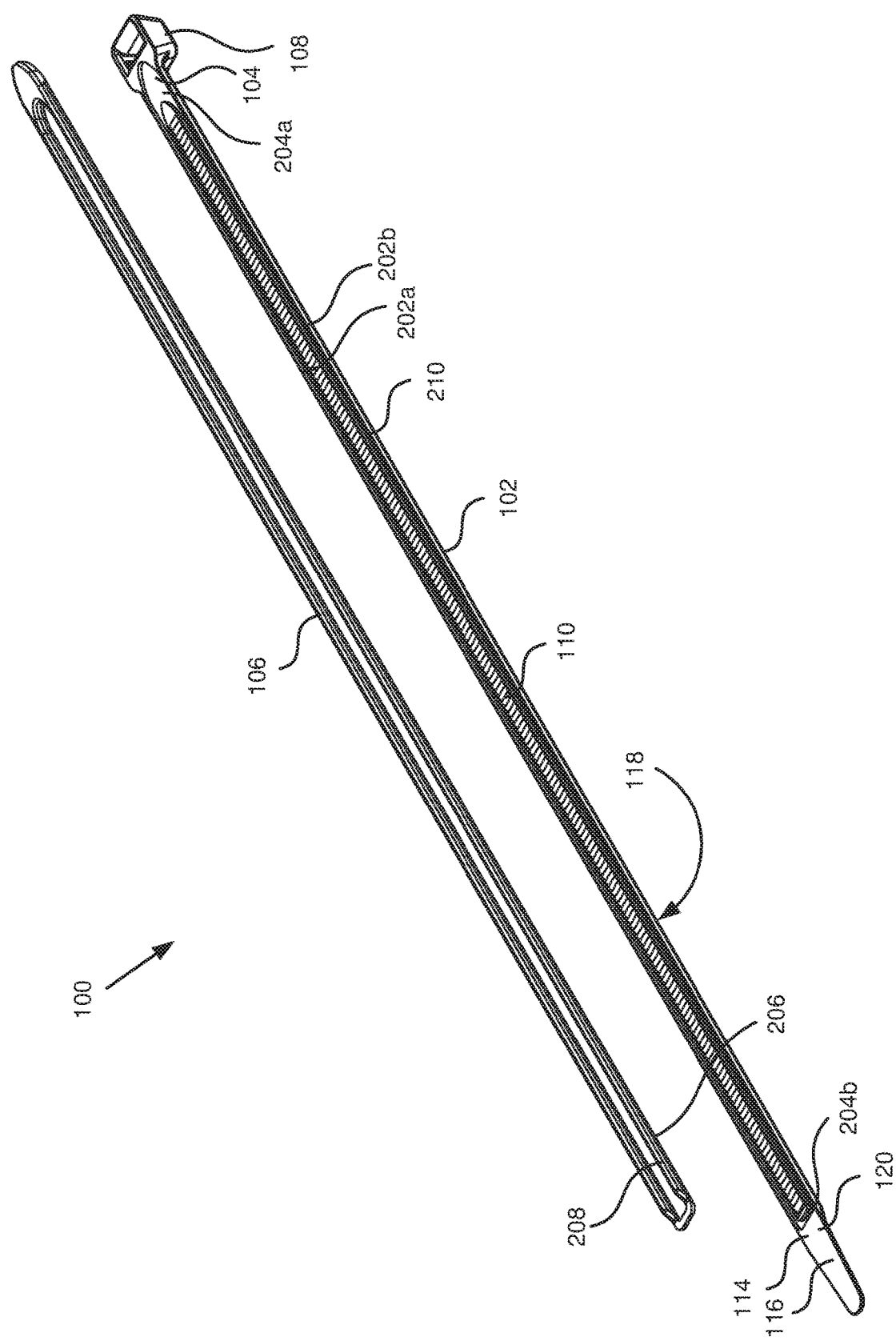
FIG. 2 is an exploded perspective view further illustrating the self-locking tie of FIG. 1 in accordance with one embodiment of the present subject matter.

FIG. 2 is an exploded perspective view illustrating the self-locking tie 100 of FIG. 1 in accordance with one embodiment of the present subject matter. In the embodiment illustrated in FIG. 2, the elastomer segment 106 has been removed from the first surface 116 of the tapered end 114 of the strap 102 to more clearly illustrate the cavity 104 in the first surface 116 of the tapered end 114 of the strap 102.

The cavity 104, in one embodiment, is an elongated channel that extends along at least a portion of the length of the tapered end 114 of the strap 102. For example, in the embodiment illustrated in FIG. 2, the cavity 104 comprises two channels 202a and 202b (collectively channels 202) that extend along both sides of the series of ridges 110 formed across most of the length of the tapered end 114 of the strap 102. The channels 202 are connected to one another by end recesses 204a and 204b (collectively end recesses 204) at either end of the tapered end 114 of the strap 102.

In other embodiments, the cavity may include channels 202 that extend along both sides of the series of ridges 110 but which are not connected to one another with end recesses 204. In another embodiment, the channels 202 may extend for a length substantially less than the length of the tapered end 114 of the strap 102. In yet another embodiment, the cavity 104 includes a series of voids (See FIGS. 7A and 7B) located along at least a portion of a length of the tapered end 114 of the strap 102.

In any of the above described embodiments, at least a portion of the elastomer segment 106 is positioned within the cavity 104 to facilitate coupling the elastomer segment 106 to the tapered end 114 of the strap 102. For example, in certain embodiments, the elastomer segment 106 includes a cavity engaging portion 206 which is received within the cavity 104. Disposing the cavity engaging portion 206 of the elastomer segment 106 within the cavity 104 helps to maintain a coupling between the elastomer segment 106 and the tapered end 114 of the strap 102 due to the fact that the cavity engaging portion 206 of the elastomer segment 106 is surrounded by the cavity 104 on three sides of the cavity 104.

An extending portion 208 of the elastomer segment 106 extends above, or protrudes beyond, a plane of the first surface 116 of the tapered end 114 of the strap 102. The elastomer segment 106 is a flexible material which may be may be comprised of materials such as silicone, rubber, thermoplastic elastomer, foam, or other materials with similar properties. The soft and flexible quality of the elastomer segment 106 enable the self-locking tie 100 to encompass one or more objects of various dimension and minimize kinks and stress points thereby reducing the self-locking tie's 100 vulnerability to wear and tear and breaking.

The friction provided by the elastomer segment 106 permits the self-locking tie 100 to grip objects more securely, holding them in place. However, the increased friction provided by the elastomer segment 106 also subjects the elastomer segment 106 to lateral forces that would not otherwise be encountered. If the elastomer segment 106 were directly coupled to the first surface 116 of the tapered end 114 of the strap 102, the lateral forces may cause the elastomer segment 106 to become separated from the first surface 116 of the tapered end 114 of the strap 102. The cavity engaging portion 206 of the elastomer segment 106 along with the cavity 104 maintain the coupling between the elastomer segment 106 and the first surface 116 of the tapered end 114 of the strap 102. The ability to hold objects more securely in place also enables the self-locking tie 100 to secure objects with less slack. The soft nature of the elastomer segment 106 also allows the self-locking tie 100 to secure objects without damaging or injuring them. For example, the soft nature of the elastomer segment 106 allows a user to position the self-locking tie 100 about a painted or otherwise finished object without worry that the paint may become scratched or otherwise damaged by the self-locking tie 100. This is particularly true in situations where the self-locking tie 100 may move or vibrate when in use.

In certain embodiments, the self-locking tie 100 is formed in a two-stage overmolding process. In the first stage, the strap 102 is formed using conventional methods known in the art. An overmold is then positioned on the strap 102 and a second stage is performed to mold the elastomer segment 106 onto the strap 102 with the cavity engaging portion 206 of the elastomer segment 106 positioned within the cavity 104.

Figure 3:
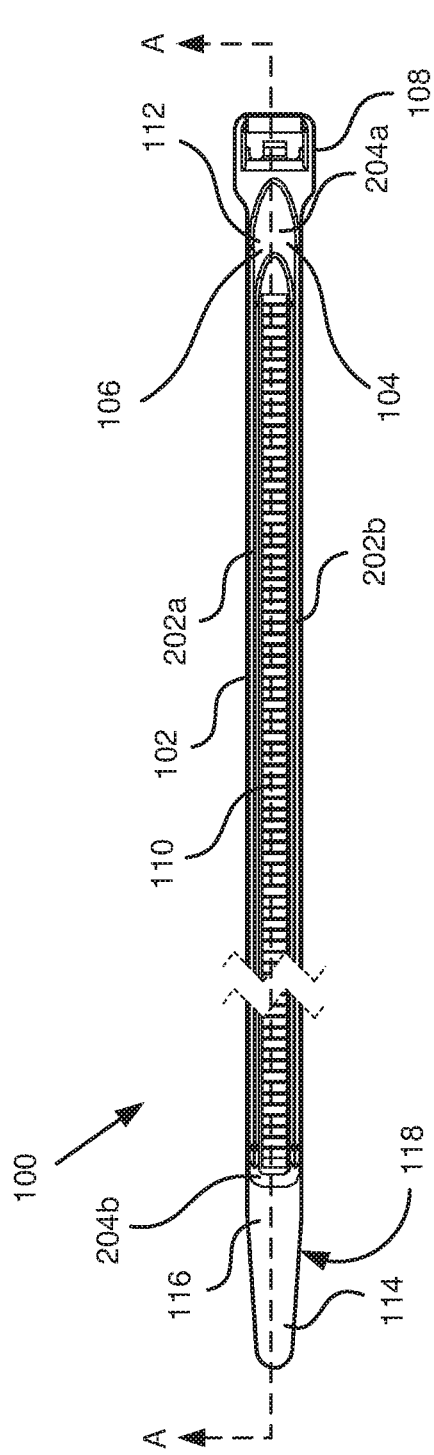
FIG. 3 is a top view further illustrating the self-locking tie of FIG. 1 in accordance with one embodiment of the present subject matter.

FIG. 3 is a top view further illustrating the self-locking tie 100 of FIG. 1 in accordance with one embodiment of the present subject matter. As discussed above, in certain embodiments, the cavity 104 includes a pair of channels 202a and 202b that extend along each side of the series of ridges 110 on the first surface 116 of the tapered end 114 of the strap 102. The channels 202 are connected to one another by end recesses 204a and 204b at either end of the tapered end 114 of the strap 102. In the illustration depicted in FIG. 3, the channels 202a and 202b and the end recesses 204a and 204b are obscured from view by the elastomer segment 106. However, one of skill in the art will recognize that the channels 202a and 202b and the end recesses 204a and 204b are positioned below the elastomer segment 106 and have been labeled as such.

In other embodiments, the strap 102 may include a single channel (not shown) that runs longitudinally down a center of the series of ridges 110 on the first surface 116 of the tapered end 114 of the strap 102. In such an embodiment, the elastomer segment 106 may be a single strip of elastomeric material that is positioned within the single channel. One of skill in the art will recognize that the cavity 104 may take many other forms without departing from the spirit or essential characteristic of the present disclosure.

Figure 4:
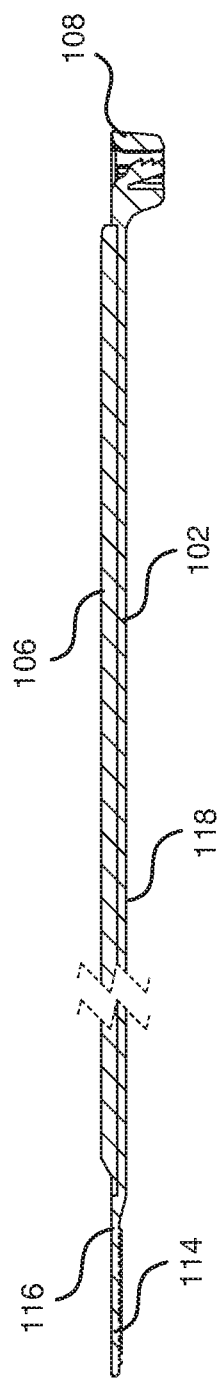
FIG. 4 is a side cutaway view taken along line A-A of FIG. 3 further illustrating the self-locking tie in accordance with one embodiment of the present subject matter.

FIG. 4 is a side cutaway view taken along line A-A of FIG. 3 further illustrating the self-locking tie 100 in accordance with another embodiment of the present subject matter. In FIG. 3, the elastomer segment 106 can be clearly seen as being positioned within channel 202a such that a portion (i.e., the cavity engaging portion 206) of the elastomer segment 106 is located below the first surface 116 of the tapered end 114 of the strap 102 and a second portion (i.e., extending portion 208) extends above the plane of the first surface 116 of the tapered end 114 of the strap 102.

Figure 5:
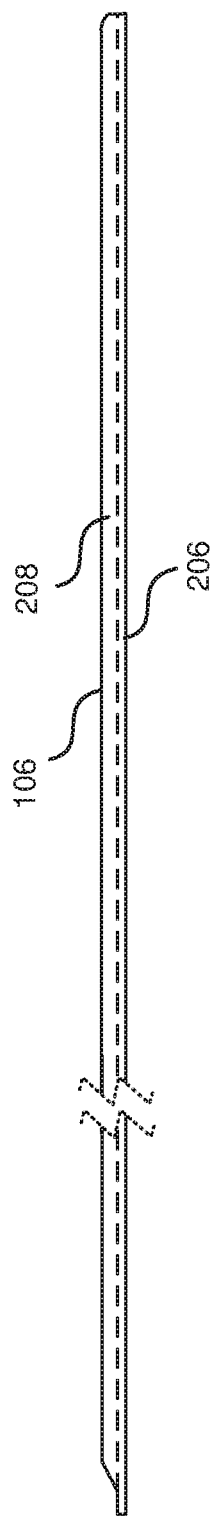
FIG. 5 is a side view further illustrating the elastomer segment of the self-locking tie of FIGS. 1-4 in accordance with another embodiment of the present subject matter.

FIG. 5 is a side view further illustrating the elastomer segment 106 of the self-locking tie 100 of FIGS. 1-4 in accordance with another embodiment of the present subject matter. As discussed above, the elastomer segment 106 includes two portions, the cavity engaging portion 206 and the extending portion 208.

In certain embodiments, the cavity engaging portion 206 of the elastomer segment 106 has a depth that is approximately the same as a depth of the extending portion 208. In other embodiments, such as in the embodiment illustrated in FIG. 5, the depth of the cavity engaging portion 206 of the elastomer segment 106 is smaller than the depth of the extending portion 208. In yet another embodiment, the depth of the cavity engaging portion 206 of the elastomer segment 106 is larger than the depth of the extending portion 208.

The cavity engaging portion 206 is received within the cavity 104. The cavity engaging portion 206 substantially fills the cavity 104 such that the cavity engaging portion 206 of the elastomer segment 106 is surrounded by the cavity 104 on three sides of the cavity 104. Positioning the cavity engaging portion 206 of the elastomer segment 106 within the cavity 104 helps to maintain a coupling between the elastomer segment 106 and the tapered end 114 of the strap 102 due to the fact that the cavity engaging portion 206 of the elastomer segment 106 is surrounded by the cavity 104 on three sides of the cavity 104.

The extending portion 208 of the elastomer segment 106 extends above the plane of the first surface 116 of the tapered end 114 of the strap 102. The soft and flexible quality of the elastomer segment 106 enable the self-locking tie 100 to encompass one or more objects of various dimensions and minimize kinks and stress points thereby reducing the self-locking tie's 100 vulnerability to wear, tear and breaking.

With the extending portion 208 extending beyond the plane of the first surface 116 of the tapered end 114 of the strap 102, the extending portion 208 increases friction between the strap 102 and any items encompassed by the strap 102. The increased friction provided by the elastomer segment 106 subjects the elastomer segment 106 to lateral forces that would not otherwise be encountered. If the elastomer segment 106 were directly coupled to the first surface 116 of the tapered end 114 of the strap 102, the lateral forces may cause the elastomer segment 106 to become separated from the first surface 116 of the tapered end 114 of the strap 102.

Figure 6:
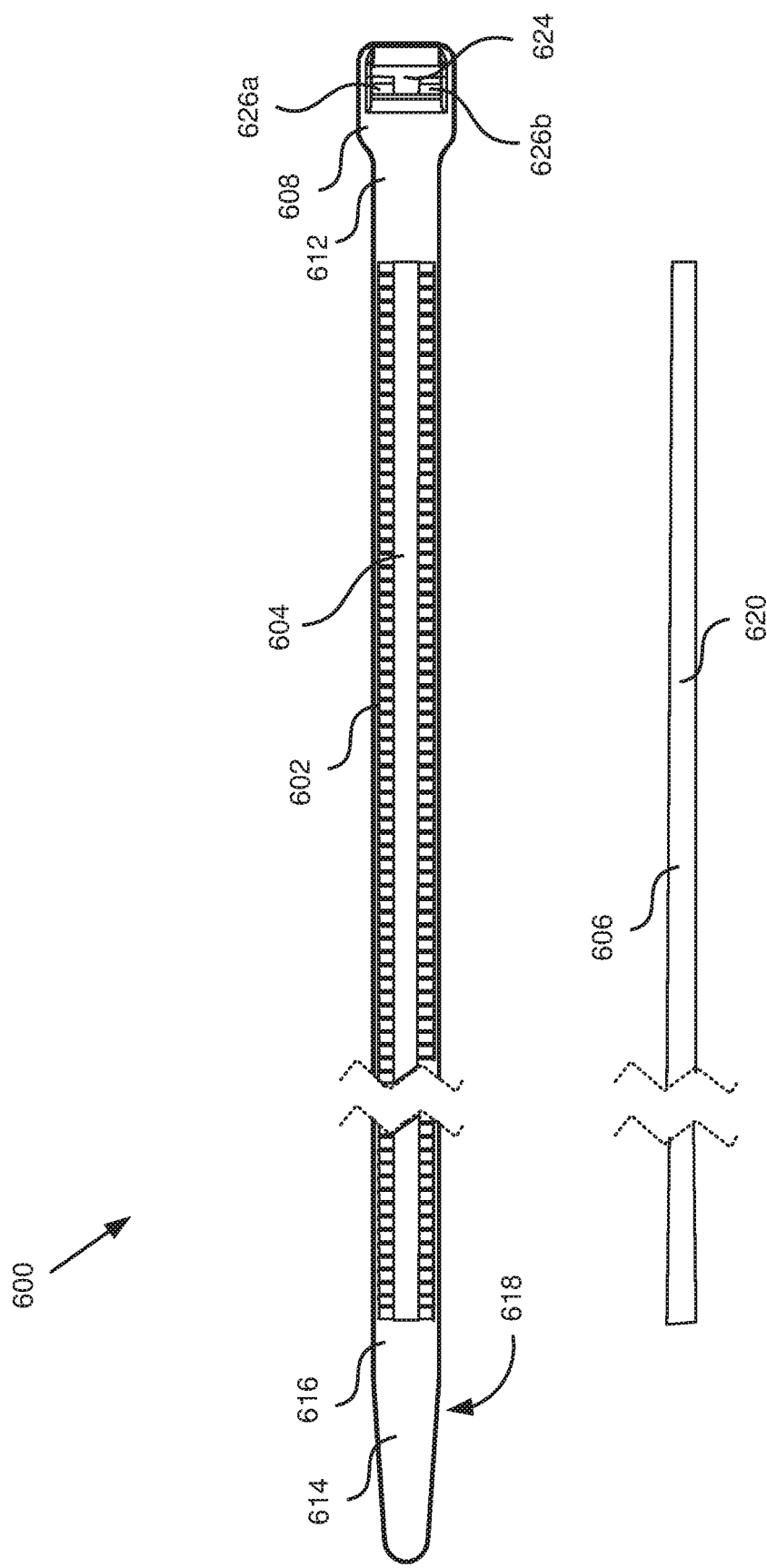
FIG. 6 is a top view illustrating another embodiment of a self-locking tie in accordance with the present subject matter.

FIG. 6 is a top view illustrating another embodiment of a self-locking tie 600 in accordance with the present subject matter. In certain embodiments, the self-locking tie 600 is substantially similar to the self-locking tie 100 discussed above. Thus, the self-locking tie 600 includes a strap 602, at least one cavity 604, an elastomer segment 606, and a locking head 608.

The strap 602, in certain embodiments, pliable material such as nylon, plastic, etc. Thus, the strap 602 is bendable to encompass one or more objects of various dimension. The strap 602 includes a head end 612 opposite from a tapered end 614. The locking head 608 is positioned on, coupled to, or integrally formed on the head end 612 of the strap 602.

In certain embodiments, the tapered end 614 of the strap 102 comprises a substantially planar, pliable strap extended in a lengthwise direction. In one embodiment, the tapered end 614 of the strap 602 can be considered the portion of the strap 602 extending from a position wherein the locking head 608 is positioned on, coupled to, or otherwise integrally formed on the head end 612 of the strap 602.

The tapered end 614 of the strap 602 includes a first surface 116 opposite from a second surface 618. In the embodiment illustrated in FIG. 6, a series of ridges 610a and 610b (collectively series of ridges 610) are depicted as extending across the first surface 616 of the tapered end 614 of the strap 602. The series of ridges 610 extend across only a portion of the first surface 616 of the tapered end 614 of the strap 602 on opposing sides of the cavity 604. The cavity 604 is located longitudinally along a center of a series of ridges 610. In other embodiments, the series of ridges 610 are located on and the cavity 604 opens to the second surface 118 of the strap 102.

The elastomer segment 606 is sized and shaped to be received within the cavity 604. As with the elastomer segment 106 discussed above, the elastomer segment 606 includes a cavity engaging portion and an extending portion 620. Because the view in FIG. 6 is a top view, only the extending portion 620 of the elastomer segment 606 can be seen.

The cavity engaging portion and the extending portion 620 of the elastomer segment 606 of the self-locking tie 600 operate in a manner substantially similar to the manner in which the cavity engaging portion 206 and the extending portion 208 of the elastomer segment 106 of the locking tie 100 operate. Thus, the cavity engaging portion substantially fills the cavity 604 and is surrounded on at least three sides to facilitate coupling between the elastomer segment 606 and the strap 602. Similarly, the extending portion 620 of the elastomer segment 606 extends beyond a plane of the first surface 616 of the tapered end 614 of the strap 602.

An orifice 624 in the locking head 608 is sized and shaped to receive the tapered end 614 of the strap 602 and to receive the elastomer segment 606 of the self-locking tie 600. Pawls 626a and 626b are configured to engage the series of ridges 610 on either side of the cavity 604 or elastomer segment 606 to maintain the tapered end 614 of the strap 602 at a desired position within the locking head 608.

While the embodiments depicted herein all illustrate the elastomer segment 106 or 606 and the series of ridges 110 or 610 on the first surface 116 or 616 of the tapered end 114 or 614 of the strap 102 or 602, one of skill in in the art will recognize that the elastomer segment 106 or 606 and the series of ridges 110 or 610 may be on opposing surfaces. That is, in one embodiment, the elastomer segment 106 or 606 may be positioned on the second surface 118 or 618 while the series of ridges 110 or 610 are on the first surface 116 or 616. Of course, the opposite is also true. That is, in other embodiments, the elastomer segment 106 or 606 may be positioned on the first surface 116 or 616 while the series of ridges 110 or 610 are on the second surface 118 or 618.

Figure 7A:
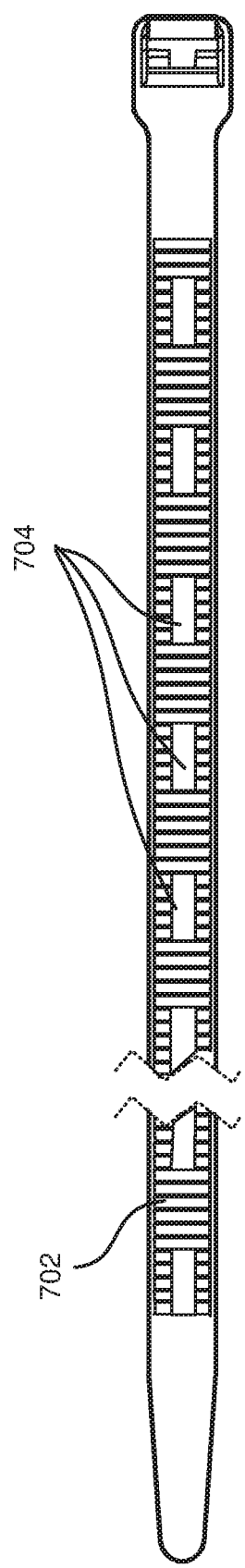
FIG. 7A is a top view illustrating another embodiment of a strap in accordance with the present subject matter.

FIG. 7A is a top view illustrating another embodiment of a strap 702 in accordance with the present subject matter. In certain embodiments, instead of including a continuous cavity, such as cavities 104 or 604 discussed above, the at least one cavity 704 includes a series of voids along at least a portion of a tapered end 714 of the strap 702. In such an embodiment, the elastomer segment 706 includes corresponding cavity engaging portions to substantially fill the voids comprising the at least one cavity 704.

Figure 7B:
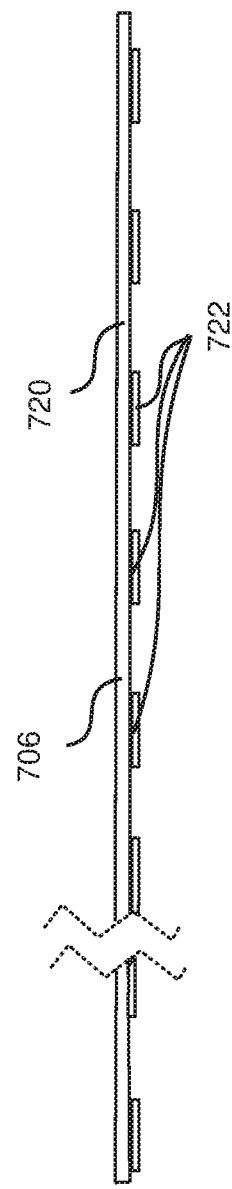
FIG. 7B is a side view illustrating one embodiment of an elastomer segment in accordance with the present subject matter.

For example, FIG. 7B is a side view illustrating one embodiment of an elastomer segment 706 in accordance with the present subject matter. In the embodiment illustrated in FIG. 7B, the elastomer segment 706 includes an extending portion 720 and a series of cavity engaging portions 722. Each of the cavity engaging portions 722 substantially fills the voids comprising the at least one cavity 704 in the strap 702.

Figure 8:
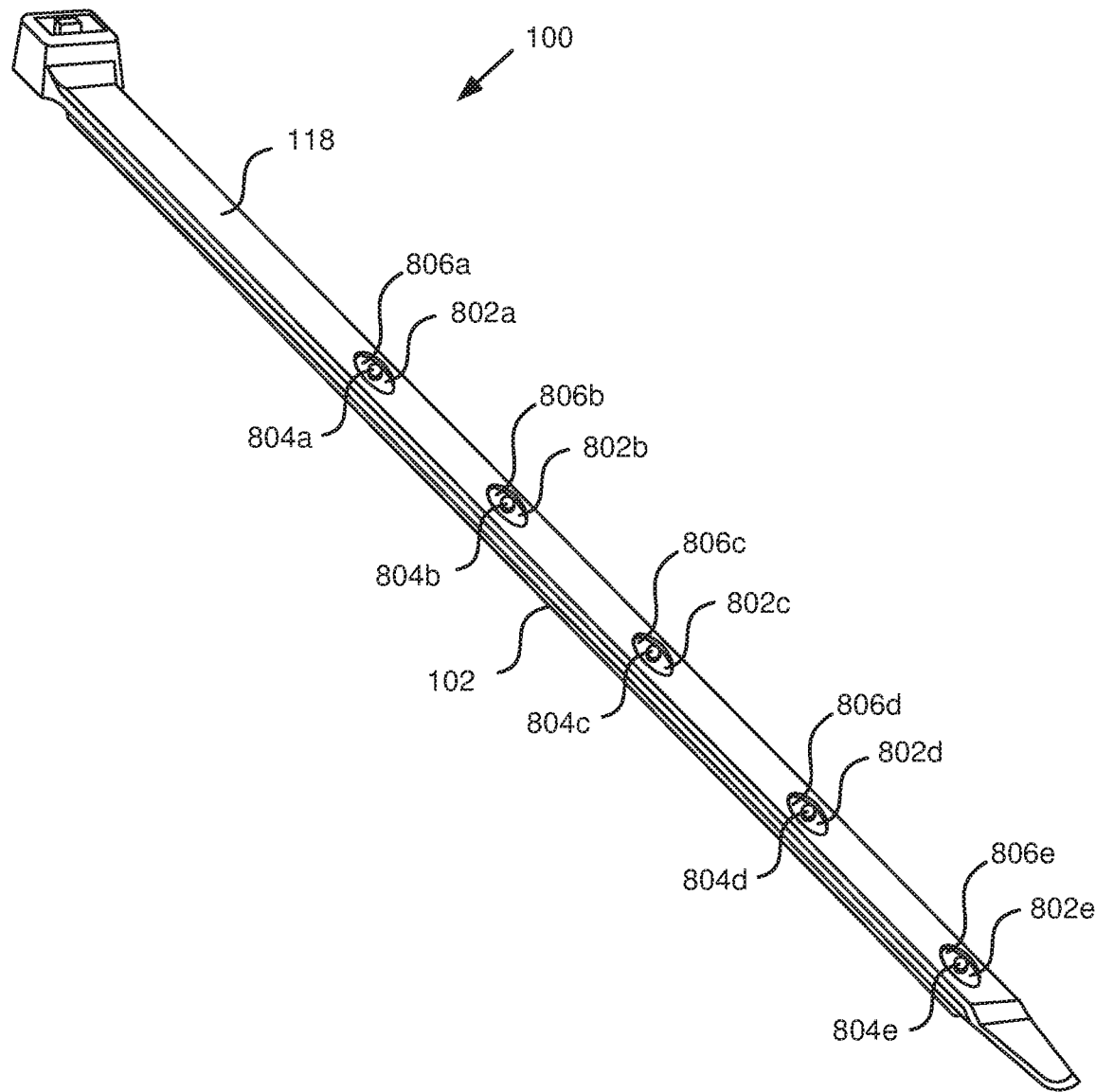
FIG. 8 is a bottom perspective view further illustrating the self-locking tie of FIG. 1 in accordance with one embodiment of the present subject matter.

Turning now to FIG. 8, an embodiment of a self-locking tie 100 (FIG. 1) is depicted that includes features that retain a position of its strap 102 (FIG. 1) within a portion of a mold cavity as the material that forms the strap 102 cools and as the strap 102 is exposed during manufacture. Although FIG. 8 includes referenced characters that correspond to those used in FIG. 1, it should be noted that the features shown in FIG. 8 may be used with any embodiment of self-locking tie according to this disclosure, including, without limitation, the embodiments of self-locking ties 600 and 702 shown in FIGS. 6 and 7A, respectively.

In certain embodiments, the second surface 118 (FIG. 1) of the strap 102 (FIG. 1) includes a plurality of recesses 802a-802e (collectively recesses 802) disposed within the second surface 118 of the strap 102. The recesses 802 offer anchoring points to hold the strap 102 in place within the mold cavity 918 (FIG. 9) in the base 902 (FIG. 9) of a mold 900 (FIG. 9) as the material of the newly formed strap 102 cools and as the newly formed strap 102 is exposed between stages of a multi-stage manufacturing process.

A core 804a-804e (collectively cores 804) is positioned within a base of each recess 802. Each core 804 may be positioned in the center of its corresponding recess 802. The core 804 protrudes from a bottom surface 806a-806e (collectively bottom surfaces 806) of its corresponding recess 802 to a position that may be substantially even with (e.g., in the same plane as, at substantially the same elevation as, etc.) the second surface 118 (FIG. 1) of the strap 102 (FIG. 1). Each core 804 is capable of being impacted by or otherwise receiving an ejector associated with a mold for manufacturing the self-locking tie 100 (FIG. 1), which may facilitate the release of the strap 102 and the self-locking tie 100 of which the strap 102 is a part from a mold cavity once the process of molding the self-locking tie 100 has been completed.

Figure 9:
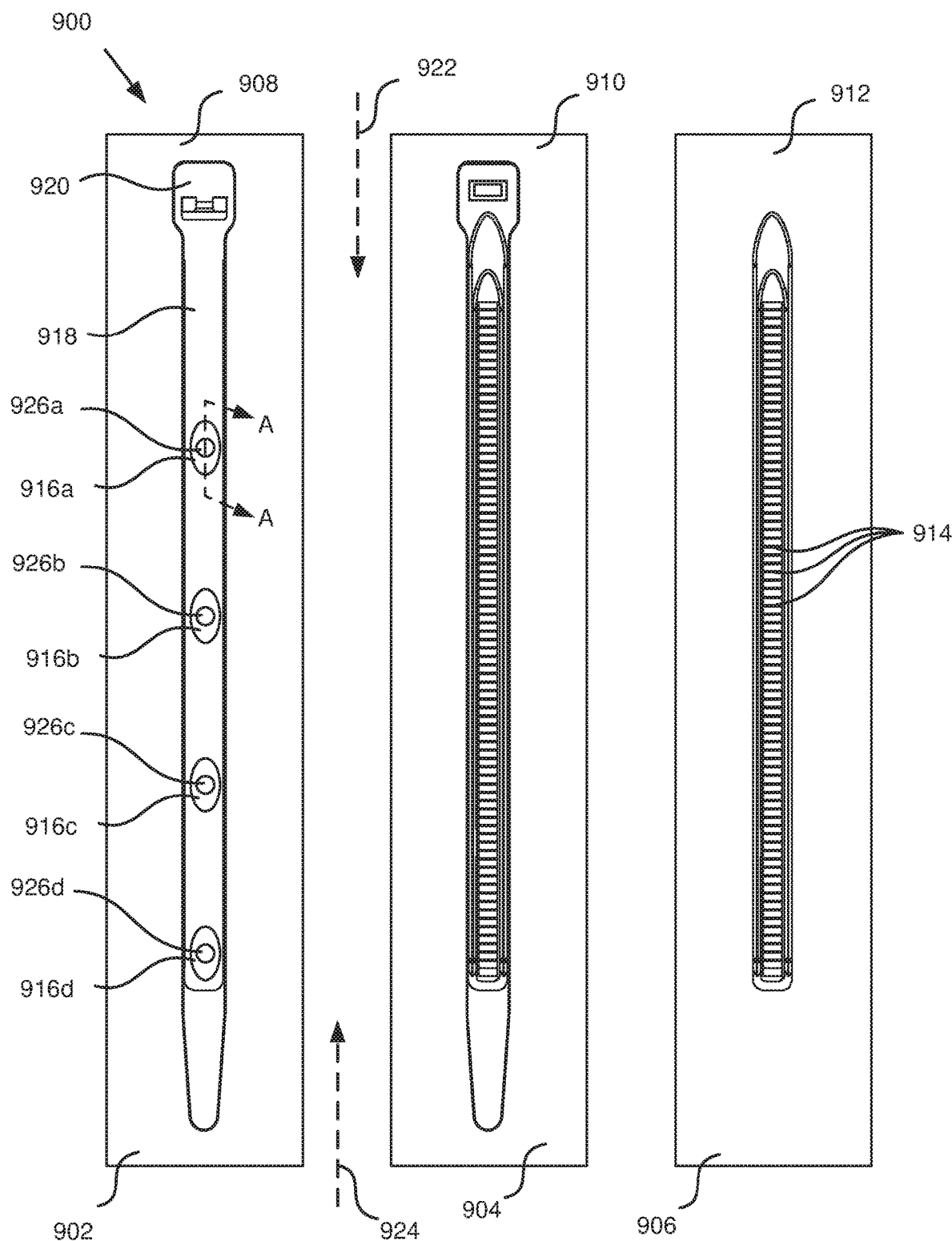
FIG. 9 is a top view illustrating one embodiment of a mold capable of forming a self-locking tie according to this disclosure.

FIG. 9 is a top view illustrating an embodiment of a mold 900 for forming a self-locking tie 100 (FIG. 1). The mold 900 includes three parts: a base 902; a top strap top mold 904; and an elastomer top mold 906. The base 902 may include recesses and other features defining part of a mold cavity 918 for forming a corresponding part of a strap 102 (FIG. 1), including the second surface 118 (FIG. 1) of the strap 102. The base 902 may also define features such as recesses 802 (FIG. 8) and cores 804 (FIG. 8) within the second surface 118 for securing the strap 102 to the base 902, and may carry features that enable removal of a finished self-locking tie 100 (FIG. 1) from the base 902. The strap top mold 904 includes recesses and other features capable of defining a first surface 116 (FIG. 1) of the strap 102. The elastomer top mold 906 is capable of alignment over a newly formed strap 102 in the mold cavity 918 of the base 902 to enable formation of elastomeric features (e.g., elastomeric features 106 shown in FIG. 1, etc.) of a self-locking tie 100 according to this disclosure.

The base 902 includes a mating surface 908. The mating surface 908 may be capable of matingly receiving a mating surface 910 of the strap top mold 904 and of matingly receiving a mating surface 912 of the elastomer top mold 906.

In an embodiment of a molding process, a strap top mold 804 may be oriented over the base 902 with the mating surface of the strap top mold 904 positioned against the mating surface 908 of the base 902. In this arrangement, the base 902 and the strap 102 (FIG. 1) to mold 904 define a strap mold cavity in the shape of the strap 102. The material from which the strap 102 is to be formed (e.g., nylon, etc.) is injected into the strap mold cavity to create the strap 102, including at least one cavity 104 (FIG. 1) in the strap 102, the locking head 108 (FIG. 1), and the series of ridges 110 (FIG. 1) of the strap 102.

The base 902 and the strap top mold 904 are then separated, and the elastomer top mold 906 is assembled with the base 902, with the mating surface 912 of the elastomer top mold 906 and the mating surface 908 of the base 902 matingly receiving each other, such that the strap 102 carried by the base 902 and the elastomeric top mold 906 define an elastomer mold cavity. More specifically, a portion of the elastomer mold cavity defined by the elastomer top mold 906 is positioned over and is continuous with cavities (e.g., the two channels 202a and 202b, the end recesses 204a and 204b, etc.) in the strap 102 (FIG. 1). In an overmold process, an elastomeric material is then injected into the elastomer mold cavity to form the elastomeric feature(s) 106 (FIG. 1) of the self-locking tie 100 (FIG. 1) and to couple the elastomeric feature(s) 106 to the strap 102.

To prevent flashing and injection of the elastomeric material onto the series of ridges 110 (FIG. 1) of the strap 102 (FIG. 1), the elastomer top mold 906 may include a series of ridges 914 configured complementary to the series of ridges 110 of the strap 102 to mate with the series of ridges 110 when the base 902 and the elastomer top mold 906 are assembled. Mating between the series of ridges 110 of the strap 102 and the series of ridges 914 of the elastomer top mold 906 protects the series of ridges 110 of the strap 102 as elastomeric material is injected into the elastomer mold cavity.

A problem may arise with mating the series of ridges 110 (FIG. 1) on the strap 102 (FIG. 1) with the series of ridges 914 in the elastomer top mold 906. Nylon and other thermoplastic elastomers, when cooled, tend to shrink. In conventional injection molding processes, shrinkage of the item as it cools helps to release the item from the cavity of the mold. However, in a multi-stage overmold process such as that described herein, the strap 102 needs to remain in the portion of the mold cavity 908 in the base 902 so the elastomeric features that are to be formed can be properly aligned. Thus, shrinkage can cause misalignment of the elastomer top mold 906 with the strap 102 and/or its series of ridges 110, which may damage the strap 102 or the series of ridges 110 or cause elastomeric material to be injected onto the series of ridges 110.

To counteract potential shrinkage-related issues, the base 902 may include features that hold the strap 102 (FIG. 1) in place after the strap top mold 904 is removed from the base 902 and while the elastomer top mold 906 is assembled with the base 902. Among these features is a series of anchors 916a-916c (collectively anchors 916) that protrude from the portion of the mold cavity 918 that defines the shape of the second surface 118 (FIG. 1) of the strap 102. When the strap 102 is positioned within the portion of the mold cavity 918 in the base 902, the anchors 916 and the corresponding recesses 802 (FIG. 8) they define in the second surface 118 of the strap 102 act as anchor points for securing the strap 102 within the mold cavity 918 of the base 902 and limiting movement as the strap 102 shrinks.

In certain embodiments, the head-forming recess 920 of the mold cavity 918 may act as an anchor point for the strap 102 (FIG. 1) as well. Given the relatively large locking head 108 (FIG. 1), once the strap 102 is molded, the locking head 108 may act as an anchor point limiting movement of the strap 102 in the direction indicated by arrow 922. As the strap 102 cools, each anchor 916 may engage a corresponding portion of the strap 102, securing the strap 102 in place within the mold cavity 918 at discrete intervals as the strap 102 shrinks (e.g., in the direction indicated by arrow 924, etc.). This facilitates alignment of the series of ridges 110 (FIG. 1) of the strap 102 with the series of ridges 914 of the elastomer top mold 906.

To facilitate removal of the strap 102 (FIG. 1) from within the mold cavity 918 of the base 902, the base 902 may include cylinders 926a-926d (collectively cylinders 926) capable of forming the cores 804 (FIG. 8) on the strap 102.

Once the overmold process has been completed and the elastomeric feature(s) 106 (FIG. 1) of the self-locking tie 100 (FIG. 1) have been formed on and coupled to the strap 102, ejectors (e.g., ejector pins, etc.) may extend through corresponding cylinders 926 the base 902, toward the mold cavity 918 and impact the cores 804 with sufficient force to eject the strap 102 from the mold cavity 918 of the base 902. The cores 804 may be formed at the centers of the recesses 802 (FIG. 8) in the second surface 118 (FIG. 1) of the strap 102. Having the cores 804 positioned within the recesses 802 may prevent deformation of the strap 102 as the strap 102 is ejected from the mold cavity 918 of the base 902.

Figure 10A:
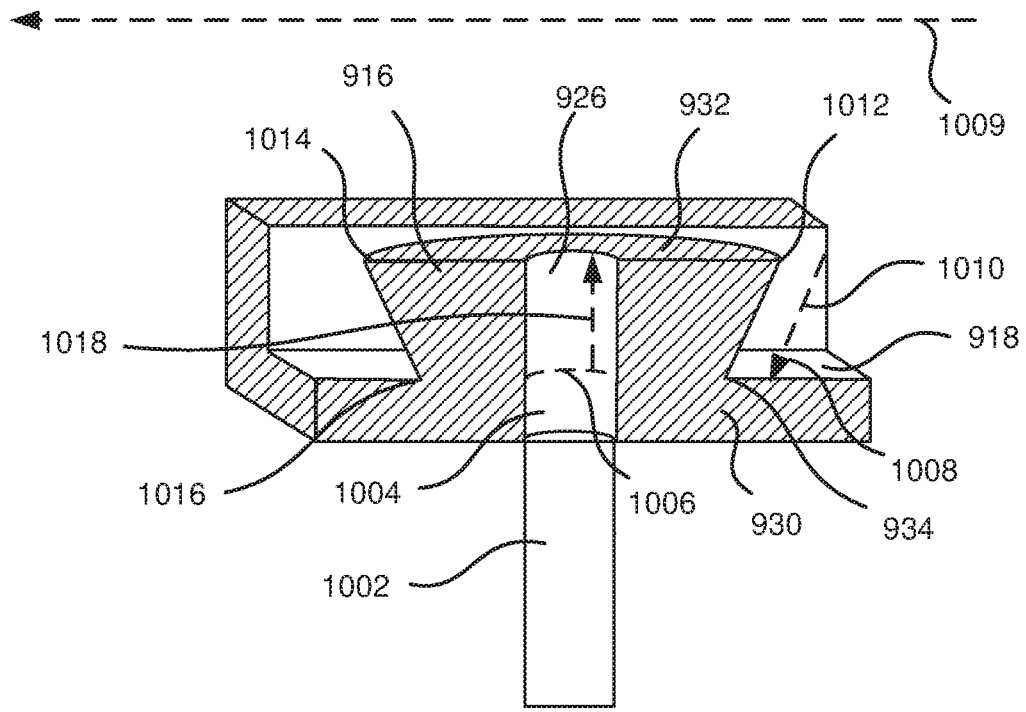
FIG. 10A is a cutaway perspective view of one embodiment of an anchor and ejector in a portion of a mold cavity of a base of the mold shown in FIG. 9.

FIG. 10A is a cutaway perspective view of an embodiment of an anchor 916 capable of forming a recess 802 (FIG. 8) in the second surface 118 (FIG. 1) of the strap 102 (FIG. 1), as well as of a pathway, or cylinder 926, that extends through the anchor 916 and that is capable of forming a core 804 (FIG. 8) surrounded by the recess 802 in the second surface 118 (FIG. 1) of the strap 102. Upon injection of a suitable material into the strap mold cavity 918, the second surface 118 of the strap 102 is defined.

In certain embodiments, ejectors 1002 may be inserted through orifices 1004 in the base 902 of the mold 900. Each orifice 1004 may communicate with a cylinder 926 that extends through an anchor 916. Each ejector 1002 may be inserted into and through an orifice 1004 to a position 1006 that is substantially coplanar with a bottom surface 1008 of the mold cavity 918. Upon injection of a suitable material into the mold cavity 918, the mold cavity 918 and the cylinder 926 may be filled with the material. The portions of the material that enter into cylinders 926 may form the cores 804 within the recesses 802 in the second surface 118 of the strap 102.

As the material cools, the strap 102 may shrink (e.g., in a direction towards the head 108 of the strap 102, etc.). The anchors 916 form anchor points to resist movement of the strap 102 during shrinkage of the strap 102 (e.g., from the tapered end 114 of the strap 102 towards the head end 112 of the strap 102, etc.) and hold the strap 102 within the mold cavity 918 of the base 902.

In the embodiment depicted by FIG. 10A, a top surface 932 of the anchor 916 extends beyond, or overhangs, a bottom end 934 of the anchor 916 in a longitudinal direction opposite from the head end 112 of the strap 102 (i.e., opposite from the direction indicated by arrow 1009), wherein shrinkage of the strap 102 may occur in a longitudinal direction towards the head end 112 of the strap 102. Thus, as the material of the strap 102 cools, the anchors 916 may force the material in the direction indicated by arrow 1010. The anchors 916 may, therefore, prevent movement of the strap 102.

Sidewalls of the anchor 916 may be sloped in such a way that the anchor 916 has a frustoconical shape (i.e., the shape of a cone from which the vertex has been truncated). Thus, a first side 1012 of a top surface 932 of the anchor 916 may extend beyond, or overhang, a bottom end 934 of the anchor 916 at the same side of the anchor 916 (e.g., in a longitudinal direction opposite from the head end 112 of the strap 102, etc.). A second side 1014 of the top surface 932 of the anchor 916 may also extend beyond, or overhang, the bottom end 934 of the anchor 916 in a longitudinal direction towards the head end 112 of the strap 102. In some embodiments, all of the outer edges of top surface 932 of the anchor 916 may be oriented at the same angle relative to the base of the mold cavity 918 (e.g., at least 80°, but less than 90°; about 85°; about 86°; about 87°; etc.). Thus, the outer edges of the top surface 932 may overhang the sidewalls of the anchor 916, defining a recess 1016 around the anchor 916. In such an embodiment, the anchor resists movement 916 of the strap in a longitudinal direction 1009 opposite from the head end 112 of the strap 102 (i.e., in the direction indicated by arrow 1009) and also in a longitudinal direction towards the head end 112 of the strap 102 (i.e., opposite the direction indicated by arrow 1009).

The strap 102, in such an embodiment, may be physically held in place by the recess 1016 around the anchor 916. To release the strap 102 from the recess 1016, the ejector 1002 may be forced into and the cylinder 926 that extends through the anchor 916 in the direction indicated by arrow 1018 (e.g., by causing the sidewalls of the recess 802 in the second side 118 of the strap 102 to stretch, etc.). Thus, the ejector 1002 may force the strap 102 off of the anchor 916.

Figure 10B:
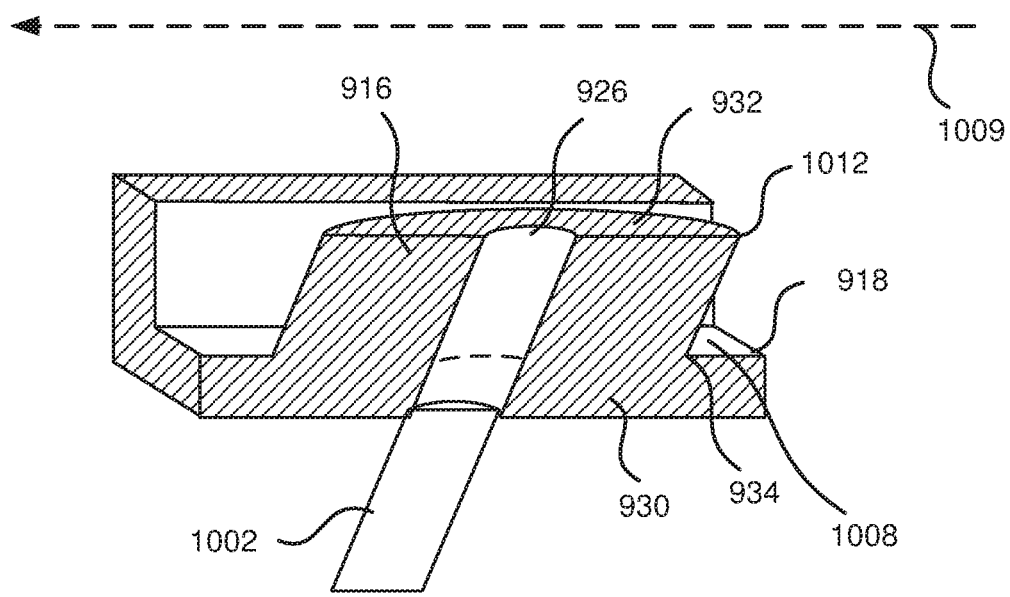
FIG. 10B is a cutaway perspective view of another embodiment an anchor and ejector in a portion of a mold cavity of a base of the mold shown in FIG. 9.

FIG. 10B is a cutaway perspective view of another embodiment of an anchor 916 capable of forming a recess 802 in the second surface 118 of the strap 102, as well as of the cylinder 926 that extends through the anchor 916 and that is capable of forming a core 804 in the recess 802 in the second surface 118 of the strap 102. Upon injection of a suitable material, the material fills the mold cavity 918, which defines the second surface 118 of the strap 102.

The anchor 916 has a slanted configuration (e.g., the appearance of a slanted column, etc., as depicted), with sloped side walls. Without limitation, the anchor 916 may be tilted by up to 10° from perpendicular to the base of the mold cavity 918 (i.e., at an angle of as small as about 80°), by about 5° from perpendicular (i.e., at an angle of about 85°), by about 4° from perpendicular (i.e., at an angle of about 86°), by about 3° from perpendicular (i.e., at an angle of about 87°), etc. Thus, at a first side 1012, the top surface 932 of the anchor 916 extends beyond, or overhangs, a bottom end 934 of the same side of the anchor 916. As the material of the strap 102 cools, the strap 102 may shrink (e.g., in a direction towards the head 108 of the strap 102, etc.). The anchor 916 forms an anchor point that may resist movement of the strap 102 within the mold cavity 918 (e.g., from the tapered end 114 of the strap 102 towards the head end 112 of the strap 102, in the direction indicated by arrow 1009; etc.).

This orientation of the anchor 916 may permit the strap 102 to be lifted up out of the mold cavity 916 in a direction opposite from the direction indicated by arrow 1009 upon actuation of the ejector 1102. While FIG. 10B illustrates a cylinder 926 and an ejector 1002 that are oriented parallel to the slant of the anchor 916, the cylinder 926 and the ejector 1002 may be oriented at another angle, including perpendicular to the base of the mold cavity 918, as depicted in FIG. 10A.

Notably, the orientations, or slopes, of the sidewalls of the anchor 918 and the angle at which the cylinder is oriented respectively define the orientations of side walls of the recesses 802 (FIG. 8) and the side walls of the cores 804 (FIG. 8) on the second side 118 of a strap 102.

Although the foregoing description provides many specifics, these should not be construed as limiting the scopes of any of the appended claims, but merely as providing information pertinent to some specific embodiments that may fall within the scopes of the appended claims. Features from different embodiments may be employed in combination. In addition, the scopes of the appended claims may encompass other embodiments. All additions to, deletions from, and modifications of the disclosed subject matter that fall within the scopes of the claims are to be embraced by the claims.

What is claimed:

1. A self-locking tie, comprising:
a strap, including:
a back side;
at least one anchor recessed in the back side; and
at least one core surrounded by and protruding relative to a base of the at least one anchor recessed in the back side of the strap; and
a front side opposite from the back side; and
an elastomeric guard on the front side of the strap.

2. The self-locking tie of claim 1, wherein the front side of the strap includes at least one cavity.

3. The self-locking tie of claim 2, wherein the elastomeric guard is secured within the at least one cavity and protrudes from the front side of the strap.

4. The self-locking tie of claim 1, wherein the at least one anchor includes at least one side wall oriented at a non-perpendicular angle relative to the back side of the strap.

5. The self-locking tie of claim 4, wherein the at least one core includes at least one side wall oriented nonparallel to the at least one side wall of the at least one anchor.

6. The self-locking tie of claim 5, wherein the at least one core includes at least one side wall oriented perpendicular to the back side of the strap.

7. The self-locking tie of claim 4, wherein the at least one side wall of the at least one anchor is oriented at an angle of up to 10° from perpendicular to the back side of the strap.

8. The self-locking tie of claim 4, wherein the at least one side wall of the at least one anchor is oriented at an angle of up to 5° from perpendicular to the back side of the strap.

9. The self-locking tie of claim 4, wherein the at least one side wall of the at least one anchor is oriented at an angle of up to 4° from perpendicular to the back side of the strap.

10. The self-locking tie of claim 4, wherein the at least one side wall of the at least one anchor is oriented at an angle of up to 3° from perpendicular to the back side of the strap.

* * * * *